Patented Sept. 8, 1925.

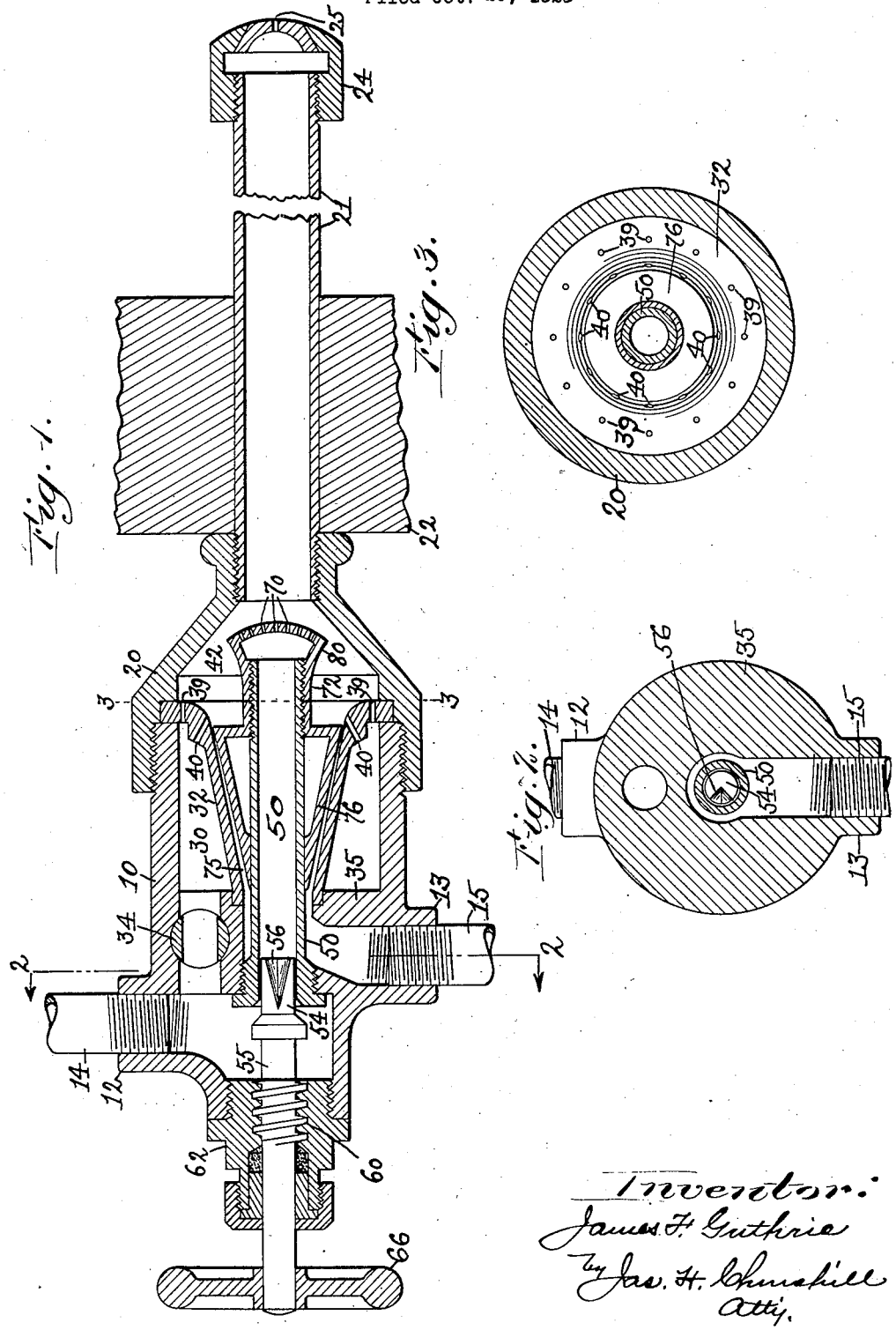

1,552,558

UNITED STATES PATENT OFFICE.

JAMES F. GUTHRIE, OF NEWTON, MASSACHUSETTS.

OIL BURNER.

Application filed October 20, 1923. Serial No. 669,733.

*To all whom it may concern:*

Be it known that I, JAMES F. GUTHRIE, a citizen of the United States, residing in Newton, in the county of Middlesex and State of Massachusetts, have invented an Improvement in Oil Burners, of which the following description, in connection with the accompanying drawings, is a specification, like characters on the drawings representing like parts.

This invention relates to a burner, and more particularly to an oil burner for furnaces, boilers and the like.

The invention has for its object to provide a novel and improved construction of burner of the character specified by which the oil or other liquid fuel is discharged from the burner in such intimate relation with steam as to obtain maximum efficiency in the operation of the burner and a minimum consumption of oil and minimum carbonization, and which in addition affords improved regulation of the heat produced. The improved burner may be economically manufactured and is adapted to operate for long periods of time without requiring attention.

To these ends the burner comprises a casing having a steam inlet and an oil inlet, and provision is made for causing the oil to be heated by the steam and to be intimately mixed therewith within the burner. Provision is also preferably made for regulating the consumption of the oil in a novel and improved manner as will be described.

These and other features of the invention will be hereinafter described and particularly pointed out in the claims at the end of this specification.

In the drawing illustrating the preferred embodiment of the invention,

Fig. 1 is a vertical section of the improved burner;

Fig. 2 is a section on line 2—2 of Fig. 1; and

Fig. 3 is a section on line 3—3 of Fig. 1.

Referring to the drawings, the burner illustrated therein comprises a casing 10 having a steam inlet 12 and an oil inlet 13 into which the threaded end of pipes 14, 15, are screwed to supply steam and oil respectively to the burner. The casing 10 is provided with a removable head 20, preferably having a conical section provided with a discharge opening in which is fitted an outlet pipe 21, which is adapted to extend through the wall 22 of the furnace or boiler, and which is provided upon its end with a removable nozzle 24 having one or more ports 25 through which the mixture of oil and steam emerges to be burned within the furnace or boiler.

The casing 10 is provided with an outer steam chamber 30, the inner wall of which is formed by a metal cone 32 removably held in position by the removable head 20. The passage of steam into the outer steam chamber 30 is controlled by a plug valve 34 located in a partition wall 35 within the casing 10 and operative from outside of the said casing. The outer end of the metal cone 32 is provided with one or more openings or orifices, and preferably with a series thereof, which are arranged in two sets, one set 39 being annularly disposed about the axis of the cone, and the second set 40 being arranged angularly for a purpose as will be described.

During the operation of the burner, steam emerges from the steam chamber 30 through the openings 39, 40 into a mixing chamber 42 formed by the cone 32 and the head 20. The casing 10 of the burner is also provided with a second steam chamber within the outer steam chamber 30, and which is herein shown as formed by a pipe 50 threaded into the internal partition wall 35, and into which the flow of steam is regulated by a valve 54.

The valve 54 preferably comprises the end portion of a valve stem or rod 55, said end portion having a longitudinally extended recess 56, preferably V-shaped and tapered outwardly in the manner illustrated in Figs. 1 and 2.

The V-shaped recess 56 co-operates with the bore of the steam pipe 50 to effectively control the admission of steam from the steam inlet 12 into the steam pipe 50. The valve stem 55 is provided with screw-threads 60 which engage a threaded bore in a stuffing box 62 of usual construction. The valve stem 55 may and preferably will be provided with the usual hand wheel 66. The steam flowing through the steam pipe 50, which comprises a second or inner steam chamber, emerges therefrom, preferably through a series of orifices 70 in a nozzle 72, which is herein shown as screwed upon the threaded end of the steam pipe, and therefore can be readily removed therefrom. The oil supplied through the oil inlet 13 is discharged into the mixing chamber 42 through an oil passage 75, herein shown as comprising an annular passage formed by the inner wall 32 of the outer steam chamber 30 and a conical valve or member 76 screwed upon the steam pipe 50, as illustrated in Fig. 1 and capable of adjustment toward and away from the inner wall 32 to thereby regulate the quantity of oil fed to the mixing chamber 42. The annular oil passage 75 thus formed is preferably of a tapering form, and the walls thereof may be of different tapers. The conical valve or member 76 may be adjusted so as to cause the oil to be supplied to the mixing chamber in a thin film, which is readily broken up or atomized by the steam.

From the above description, it will be seen, that the oil on its passage to the mixing chamber is rendered fluent by the heat from the outer and inner steam chambers 30, 50, and is thus placed in a condition in which it may be quickly and easily atomized or broken up into minute particles by the steam jets which issue from the ports 39, 40, which are arranged to project the steam in two directions at an angle to each other.

The steam ports 39 are annularly arranged about the outlet mouth of the oil supply passage 75 and the steam from these ports meets the oil and projects it against the conical wall of the mixing chamber 42, by which the mixture of oil and steam is directed to the outlet pipe 21.

The steam ports 40 are arranged at an angle to the outlet mouth of the oil passage 75 and so as to project the steam issuing from them across the oil issuing from the oil passage, and toward the nozzle 72, and thereby act to atomize the oil.

The nozzle 72 is preferably provided with an outwardly curved or flaring end portion 80, which co-operates with the steam ports 40 so as to be struck by the oil projected by the steam issuing from the ports 40, and thereby assist in the atomizing of the oil. The flaring end portion 80 also acts as a deflector to cause the current of steam and oil created by the steam issuing from the ports 40, to be directed against the conical end wall of the mixing chamber 42, where said current meets the current of oil and steam created by the steam issuing from the ports 39.

In this manner, the oil and steam is efficiently mixed within the mixing chamber by the steam issuing from the outside steam chamber 30, and this mixture is further mixed by the steam from the inner steam chamber 50, which is projected through the ports 70 in the steam nozzle 72, and which meets the mixture of oil and steam as it passes from the mixing chamber and projects it into the outlet pipe from which it passes through the nozzle 24 into the boiler. The nozzle 72 acts as a nut with respect to the valve 76 to keep the latter in its adjusted position.

The oil consumption may be adjusted in a simple and economic manner by removing the head 20 from the end of the burner casing and adjusting the valve 76 upon the steam pipe 50, so as to more or less close or open the annular oil passage 75, through which the oil passes into the mixing chamber. After an adjustment of the valve 76 has been made, the head 20 may be replaced and the burner installed, and the oil consumption of the burner remains constant, free from being tampered with, thus insuring that the burner operates in accordance with a predetermined adjustment.

The thoroughness with which the oil is atomized or mixed in intimate association with the steam insures a thorough combustion within the fire box, resulting in increased efficiency of the fire and avoiding to a large extent the formation of carbon or soot.

The oil consumption of the burner may be cut down to a minimum, the annular oil passage controlling the oil supply within the burner casing offering a wide range of adjustments. This results in an improved regulation of the fire and a general increase in the efficiency of the burner over existing types.

While the preferred embodiment of the invention has been illustrated and described, it is not desired to limit the invention to the particular construction shown.

Having thus described the invention, what is claimed is:

1. A burner comprising a casing having a steam inlet, an oil inlet and a discharge opening, a steam chamber formed within the casing and having a conical inner wall with its larger diameter toward the discharge opening and provided with a steam outlet passage at its larger end, a cone within said conical inner wall with its larger diameter toward said discharge opening and forming with the conical inner wall a conical oil passage communicating with the oil inlet at its smaller diameter and with said discharge opening at its larger diameter, the steam outlet passage for said steam chamber being arranged at an angle to the axis of said conical oil passage to discharge steam against the stream of oil issuing from said oil passage.

2. A burner comprising a casing provided with a steam inlet and a steam outlet, two steam chambers within the casing arranged one within the other in fixed relation to said casing, each having a valve within the casing for controlling the flow of steam therethrough and being provided with discharge orifices spaced apart and arranged to discharge two separate bodies of steam into said casing, and a conical valve interposed between said steam chambers to form with the outer steam chamber a conical oil passage and adjustable on the inner steam chamber to vary the size of said oil passage.

3. A burner comprising a casing provided with a steam inlet, an oil inlet and a discharge opening, an outer steam chamber having a conical inner wall with its larger diameter toward the discharge opening of said casing, an inner steam chamber extended axially of said outer steam chamber, said steam chambers having steam outlet ports arranged to discharge toward the discharge opening of said casing, and a conical valve mounted on said inner steam chamber with its larger diameter toward said discharge opening and co-operating with the conical wall of said outer steam chamber to form a conical oil passage having its larger diameter toward the discharge opening of said casing.

4. A burner comprising a casing provided with a steam inlet and an oil inlet and with a removable head having a discharge opening, a partition wall within said casing, a conical wall cooperating with said partition wall and said casing to form an outer steam chamber and cooperating with said removable head to form a mixing chamber within said casing, a pipe carried by said partition wall and forming an inner steam chamber discharging into said mixing chamber, a cone on said pipe cooperating with the conical wall of said outer steam chamber to form an oil passage discharging into said mixing chamber, said conical wall having a plurality of sets of orifices discharging into said mixing chamber in different directions.

5. A burner comprising a casing provided with a steam inlet and an oil inlet and with a removable head having a conical section provided with a discharge opening and forming within the casing a mixing chamber, a partition wall within said casing, a conical wall co-operating with said partition wall and said casing to form an outer steam chamber, a pipe carried by said partition wall and forming an inner steam chamber, and a conical valve on said pipe co-operating with the conical wall of the outer steam chamber to form an oil passage communicating with the mixing chamber within said casing.

6. A burner comprising a casing having a steam inlet, an oil inlet and a discharge opening, a steam inlet pipe axially arranged within said casing and provided at its outlet end with a nozzle, a valve within the casing co-operating with the opposite end of the steam inlet pipe to control the supply of steam thereto, an outer steam chamber within the casing provided with a conical inner wall surrounding the said steam inlet pipe and having a steam outlet arranged to project steam against said nozzle, and a conical valve mounted on said steam inlet pipe to move longitudinally thereon and co-operating with the conical inner wall of said outer steam chamber to form a conical oil passage between said outer steam chamber and said steam inlet pipe.

7. A burner comprising a casing provided with a steam inlet and an oil inlet and with a removable head having a conical section provided with a discharge opening, a partition wall within said casing, a conical wall cooperating with said partition wall and with said casing to form an outer steam chamber and cooperating with said removable head to be held thereby and form therewith a mixing chamber within said casing, a pipe carried by said partition wall and forming an inner steam chamber terminating within said mixing chamber, a cone on said pipe cooperating with said conical wall to form an oil passage discharging into said mixing chamber and adjustable on said pipe to form a valve to regulate the amount of oil discharged into said mixing chamber, a nozzle on the discharge end of said pipe to maintain the said valve in its adjusted position, said conical wall of said outer steam chamber having a set of orifices arranged to discharge steam against the conical section of the removable head of the casing and having a second set of orifices arranged at an angle to the first set to discharge steam against the nozzle of said steam pipe.

8. A burner comprising a casing provided with a steam inlet, an oil inlet and a discharge opening, an outer steam chamber within the casing having a conical inner wall arranged with its larger diameter toward said discharge opening, means for forming an inner steam chamber, a removable head for said casing co-operating with said steam chambers to form a mixing chamber, and a conical valve co-operating with the conical wall of the outer steam chamber to form an oil passage which discharges into said mixing chamber, said conical valve being movable on said inner steam chamber to vary the size of said oil passage.

In testimony whereof, I have signed my name to this specification.

JAMES F. GUTHRIE.